(12) United States Patent
Borrmann (10) Patent No.: US 7,731,206 B2
(45) Date of Patent: Jun. 8, 2010

(54) FORK-LIFT TRUCK AND KIT FOR TRUCK (75) Inventor: Hans-Peter Borrmann, Goch-Nierswalde (DE)

(73) Assignee: Borrmann GmbH, Goch-Nierswalde (DE)

( * ) Notice: Subject to any disclaimer, the term of this patent is extended or adjusted under 35 U.S.C. 154(b) by 1169 days.

(21) Appl. No.: 10/553,808

(22) PCT Filed: Apr. 22, 2004

(86) PCT No.: PCT/EP2004/004249

§ 371 (c)(1),
(2), (4) Date: Oct. 18, 2005

(87) PCT Pub. No.: WO2004/094212

PCT Pub. Date: Nov. 4, 2004

(65) Prior Publication Data

US 2006/0225963 A1    Oct. 12, 2006

(30) Foreign Application Priority Data

Apr. 23, 2003  (DE) ................................ 103 18 458
May 17, 2003  (DE) ............................ 203 07 717 U (51) Int. Cl.
B62B 3/06   (2006.01)
(52) U.S. Cl. .................................................. 280/47.34
(58) Field of Classification Search .............. 280/47.11, 280/47.34, 47.371; 187/222, 237; 414/628–633
See application file for complete search history.

(56) References Cited

U.S. PATENT DOCUMENTS 3,561,628 A * 2/1971 Melin ......................... 414/664

(Continued)

FOREIGN PATENT DOCUMENTS

DE          2852835          6/1980

(Continued)

OTHER PUBLICATIONS

"Alle Vorteile auf einen Blick!" p. 122 of *Deutsche Hebe- und Foerdertechnik*, vol. 19, Book 11, 1973 (Translation: "All Advantages in one glance").

(Continued)

*Primary Examiner*—Lesley Morris
*Assistant Examiner*—Vaughn T Coolman
(74) *Attorney, Agent, or Firm*—Collard & Roe, P.C.

(57) ABSTRACT

The invention relates to a fork-lift truck comprising two steering wheels mounted on one axle, provided with a lifting and steering device arranged thereon and a fork-carrier frame mounted on the track rollers, comprising two supporting beams. The fork-carrier frame is mounted in such a manner that it interacts with the lifting and steering device. The fork-lift truck also comprises a set of wheels which can be disposed in the region of the front ends of the fork of the supporting beams on the fork-carrier frame. The aim of the invention is to enable a fork-lift truck to be fitted with an additional set of wheels if desired without having an adverse effect on the advantages of the use thereof. This is achieved by virtue of the fact that the fork-lift truck comprises overlapping tracks which extend the supporting beams and which can be detachably fixed to the fork-carrier frame and can be placed onto the supporting beams. The set of wheels are detachably arranged on the front side of the tracks.

27 Claims, 8 Drawing Sheets

U.S. PATENT DOCUMENTS

| | | | |
|---|---|---|---|
| 3,576,333 A | | 4/1971 | Danielson et al. |
| 4,813,703 A | * | 3/1989 | Fischer .................... 280/43.12 |
| 4,941,794 A | * | 7/1990 | Hara et al. .................. 414/341 |
| 5,221,176 A | * | 6/1993 | Allen et al. ................. 414/785 |
| 5,692,583 A | * | 12/1997 | Reed et al. .................. 187/237 |
| 5,752,584 A | * | 5/1998 | Magoto et al. .............. 187/234 |
| 6,015,255 A | * | 1/2000 | Vander Meer ............... 414/607 |
| 6,021,869 A | * | 2/2000 | Fischer ....................... 187/234 |
| 6,616,395 B2 | * | 9/2003 | Fransson .................... 414/495 |
| 2004/0232638 A1 | * | 11/2004 | Lo ........................... 280/47.34 |

FOREIGN PATENT DOCUMENTS

| | | |
|---|---|---|
| DE | 34 34 324 A1 | 6/1985 |
| DE | 3434324 | 6/1985 |
| DE | 270697 | 8/1989 |
| FR | 1550367 | 12/1968 |
| GB | 2 121 759 A | 1/1984 |
| GB | 2121759 | 1/1984 |

OTHER PUBLICATIONS

Alle Vorteile Auf Einen Blick Nov. 1973 (cited in Priority Document).

International Search Report, Aug. 10, 2004.

* cited by examiner

FORK-LIFT TRUCK AND KIT FOR TRUCK

CROSS REFERENCE TO RELATED APPLICATIONS

Applicant claims priority under 35 U.S.C. 119 of German Application No. 103 18 458.9 filed Apr. 23, 2003 and of German Application No. 203 07 717.2 filed on May 17, 2003. Applicant also claims priority under 35 U.S.C. 365 of PCT/EP2004/004249 filed on Apr. 22, 2004. The international application under PCT article 21(2) was not published in English.

The invention relates to a forklift truck comprising two steering wheels mounted on one axle, having a lifting and steering device arranged thereon, and comprising a fork carrier frame mounted on running rollers, having two supporting beams, which is mounted in such a manner that it stands in interaction with the lifting and steering device, and comprising a wheel set that can be disposed on the fork carrier frame, in the region of the front fork ends of the supporting beams. Furthermore, the invention is directed at a forklift truck kit.

Forklift trucks are used to enable a person to move pallets and goods stored on pallets from one location to another location. In this connection, the forklift truck moves under the pallet with its forks or supporting beams, then the forklift truck is raised, causing the pallet to be lifted up from the ground, so that the truck can be moved. Since nowadays, the so-called Euro pallets are generally used, the forklift trucks are configured in standardized manner with regard to the fork lengths and their distance from one another. In this connection, the forks or supporting beams have such a length that when the forklift truck has moved under a pallet, the ends of the forks or supporting beams do not project from under the pallet, i.e. do not stand out from the footprint of the pallet. In order to be able to lower the forks and move them in under the pallets, the forklift trucks are connected with a hydraulic lifting device, for one thing and, for another thing, have relatively small running wheels or running rollers, at least under the forks or supporting beams. This results in the disadvantage that the forklift trucks are difficult to move or drive on uneven or bumpy surfaces.

In order to counteract this problem, it is proposed, in the state of the art, to equip a forklift truck with an additional wheel set, which can be affixed to the ends of the forks or the ends of the supporting beams. Thus, a forklift truck of this type is known from DE-A1-28 52 835. This forklift truck has steering wheels having air-filled tires on one side, mounted on an axle, which wheels are connected to interact with a lifting and steering device, and is equipped with a coupling mechanism on the opposite ends of the supporting beams, which mechanism makes it possible to affix a wheel set also having air-filled tires there. A further development in this regard is disclosed by DD-A1-270 697 which, in contrast with the forklift truck according to DE 28 52 835, makes do with only one lifting device. A lift transport truck having a wheel set that can be affixed separately is also disclosed by the French patent FR 1 550 367.

In the case of all of the forklift trucks known from the state of the art, these are special constructions or special productions. In order to be able to affix the wheel sets, either supporting beams or forks that project beyond the footprint of the pallet must be provided, so that the wheel set can be easily affixed, or the wheel set must be affixed while the ends of the fork or supporting beam are pushed into the pallet, in very uncomfortable manner, which results in uncomfortable handling of such a forklift truck. The additional wheels of the wheel set that make the forklift truck "terrain-worthy" cannot be installed before the forklift truck moves under the pallet, since then it would not be possible for the forks or supporting beams of the forklift truck to move under the pallet.

Also, it is not possible to retrofit forklift trucks in such a manner that the additional wheel set can be installed only in desired individual cases, whereby in these cases, the fork ends then project out under the pallet, whereas in all other cases, when the additional wheel set is not used, the fork ends do not project out from the pallet area.

In contrast, the invention is based on the task of creating a solution that makes it possible to equip a forklift truck with an additional wheel set, if desired, without impairing its utilization advantages otherwise.

In the case of a forklift truck of the type designated initially, this task is accomplished, according to the invention, in that the forklift truck has overlapping rails that extend the supporting beams, which are pushed onto the supporting beams and are releasably attached to the carrier frame, on the face of which rails the wheel set can be releasably disposed.

According to the invention, a forklift truck kit is characterized by overlapping rails that can be pushed onto the supporting beams and releasably attached to the fork carrier frame, which extend the supporting beams in their position in which they are pushed onto the supporting beams, and by a wheel set that can be releasably attached to the face of two overlapping rails in their position in which they are pushed onto the supporting beams.

By means of the forklift truck according to the invention and the forklift truck kit according to the invention, it is made possible to make a standard-type forklift truck that is equipped with forks or supporting beams that do not project beyond the pallet area when they move under a pallet "terrain-worthy" despite this. Such a forklift truck is equipped with an additional wheel set having an appropriately large wheel diameter, which makes the forklift truck "terrain-worthy," in that overlapping rails are pushed over the forks or supporting beams of the forklift truck, and a wheel set is attached to the face of these rails. In this connection, the overlapping rails extend the supporting beams, so that their ends then project beyond the pallet area when the forklift truck has moved under a pallet. In this position, the additional wheel set can easily be attached to the ends of the overlapping rails that project under the pallet area. The forklift truck kit furthermore has the advantage that usual, standard-type forklift trucks can also be retrofitted by using this kit.

Particularly good and practical fixation and locking of the wheel set on the overlapping rails can be achieved in that the overlapping rails have face openings and underside openings or contact surfaces that can be releasably brought into connection with the locking means of the wheel set, something that the invention provides in its configuration.

A practical implementation of these locking means is characterized, in a further development of the invention, in that the overlapping rails have a coupling bore that can be brought into engagement with a coupling bolt of the wheel set, in each instance, at their front ends. This bore can furthermore be combined with a configuration that is characterized in that the overlapping rails have an engagement opening that can be brought into engagement with a catch nose of the wheel set, in each instance, at the front, on the underside.

However, it is also possible, according to a configuration of the invention, that the overlapping rails have a contact surface that can be brought into contact with a catch nose of the wheel set, in each instance, at the front, on the underside.

It can furthermore be provided that the overlapping rails have approximately the length of the supporting beams. According to a configuration of the invention, however, it is also possible that the overlapping rails merely have about half the length of the supporting beams.

It is practical that the invention provides, in a further development, that the forklift truck has two overlapping rails configured symmetrically to the center area between the supporting beams, which are pushed onto the front regions of two supporting beams from the front, and are secured on the latter to prevent unintentional displacement.

For the wheel set, it is practical if the latter has running wheels having a diameter that corresponds to the diameter of the steering wheels, disposed on an axle so as to rotate. This results in particular stability of the forklift truck provided with the wheel set; in particular, the load surface is then oriented horizontally. In this manner, one then arrives at a forklift truck that can easily be moved also on asphalt surfaces and uneven floors. The running wheels have a diameter such that unevenness of the ground or smaller stones lying on the floor ahead of the running wheels do not cause any problems.

For attachment of the wheel set, the invention provides, in an advantageous further development, that the wheel set has two coupling bolts having a distance between them that corresponds to the distance between the center axes of the supporting beams, which coupling bolts can be releasably coupled with the front ends of the overlapping rails.

In a further configuration, the invention provides that the wheel set has an axle on which a frame that runs parallel to the axle and is disposed to rotate on the axle is disposed, which has a holder plate and two stirrups spaced apart from one another in the longitudinal direction of the axle, at a distance from the holder plate, whereby each stirrup has a coupling bolt that is disposed in fixed manner, with which the wheel set can be releasably coupled to the front ends of the overlapping rails.

Figure 9:
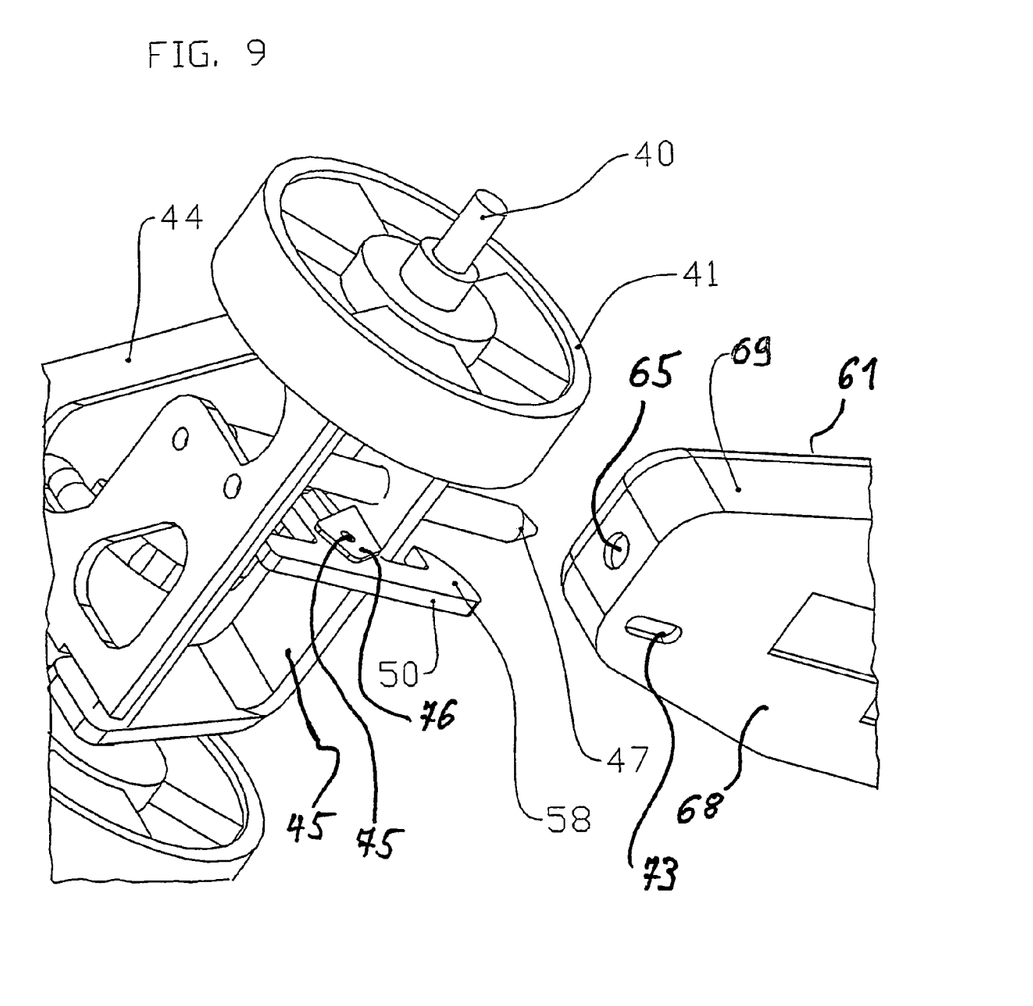

In order to mount the catches that are to be brought into engagement with the overlapping rails in such a manner that they are guided (back) into their starting and locking positions, for example as shown in FIG. 9, under the effect of spring force, the invention provides, in a configuration, that the rear part of the catches that have a nose, in each instance, is mounted on the holder plate under spring force.

A particular contribution to the stability of the forklift truck when the wheel set mounted on it is achieved in that in a further development according to the invention, three running wheels are disposed on the axle of the wheel set.

The invention can be used in particularly practical manner in the case of forklift trucks in which a running roller, in each instance, is disposed in the region of the front end of the supporting beams, which is mounted to move in a pivoting motion, by means of a rod mechanism, in each instance, something that the invention also provides.

Finally, the invention can be used particularly advantageously in the case of a forklift truck that is characterized in that it has a lifting device mounted on the axle of two steering wheels, and a carrier frame mounted on two running rollers, having two supporting beams, which frame is connected with the lifting and steering device in movable manner, whereby the lifting device has a lifting pump that is disposed on a console, which is disposed on a support mounted on the axle between the two steering wheels, and whereby a steering and lifting rod is disposed on the lifting pump, and the lifting pump has a piston rod whose head projects upward out of the housing of the lifting pump, and whereby a running roller is disposed on the front end of the two supporting beams, in each instance, and the supporting beams are connected with one another at the rear end, by way of a cross-beam, and a holder frame having a joint pan is provided at the rear end of the supporting beams, which pan is mounted on the head of the piston rod, in articulated manner, and whereby a two-arm rod mechanism is disposed on both sides of the console, in each instance, the rear arms of which are connected with the console, and the front rods of which are connected with the related running roller, so as to pivot, in each instance.

Advantageous and practical further developments and configurations of the forklift truck kit are evident from claims 18 to 29, whereby the advantages connected with them correspond to the advantages connected with the corresponding configurations of the forklift truck.

The invention will be explained in greater detail below, using the drawing, as an example. The drawing shows.

Figure 1:
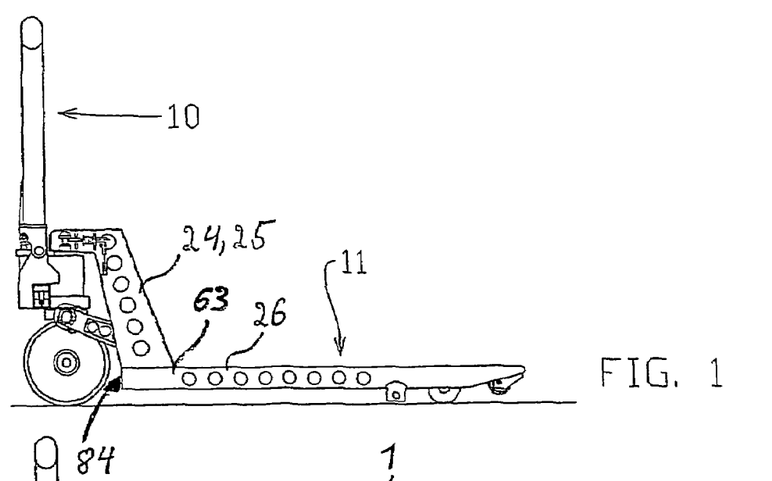
FIG. 1 a known forklift truck in a side view.
Figure 2:
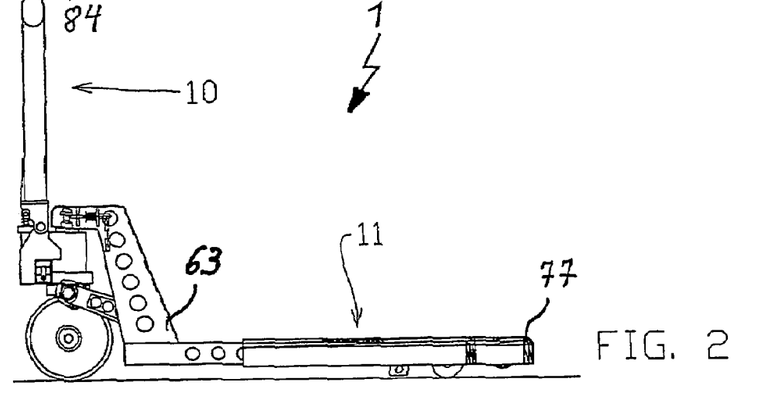
FIG. 2 a forklift truck in a side view, with overlapping rails pushed onto it, in its position underneath the pallet, FIG. 3 a forklift truck in a side view, with overlapping rails pushed onto it and the wheel set affixed, in its pallet transport position, FIG. 4 the forklift truck according to FIG. 1 in an enlarged view, FIG. 5 a wheel set in a perspective view, FIG. 6 the wheel set according to FIG. 5, with overlapping rails, in a perspective view, FIG. 7 the wheel set according to FIG. 5, in a position coupled onto the overlapping rails, in a perspective view, FIG. 8 the wheel set according to FIG. 5, in a position coupled onto the overlapping rails, in a perspective view, FIG. 9 an enlarged detail view of the left part of FIG. 5 in a perspective view from below, FIG. 10 a detail view of the left part of FIG. 6 in a perspective view from below, FIG. 11 a representation of an alternative embodiment of a forklift truck kit according to the invention, in a perspective view from below, and in FIG. 12 the attachment arrangement of the embodiment according to FIG. 11, in the rear region of a forklift truck frame.
Figure 3:
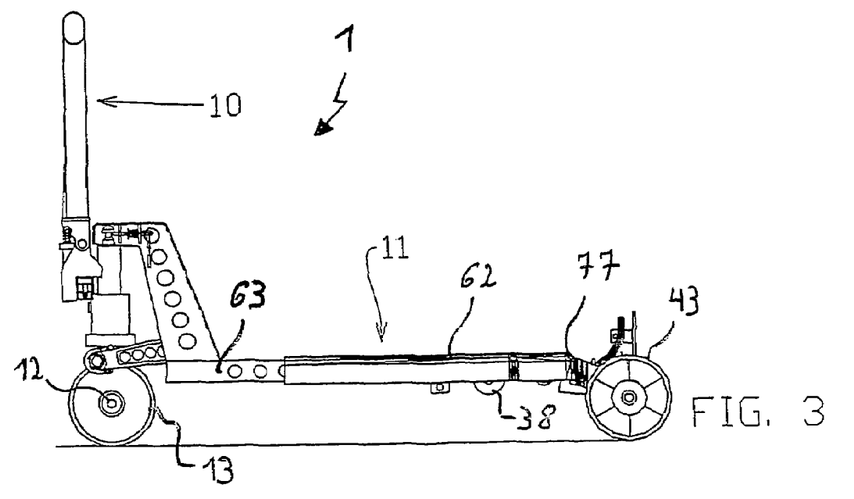
Figure 4:
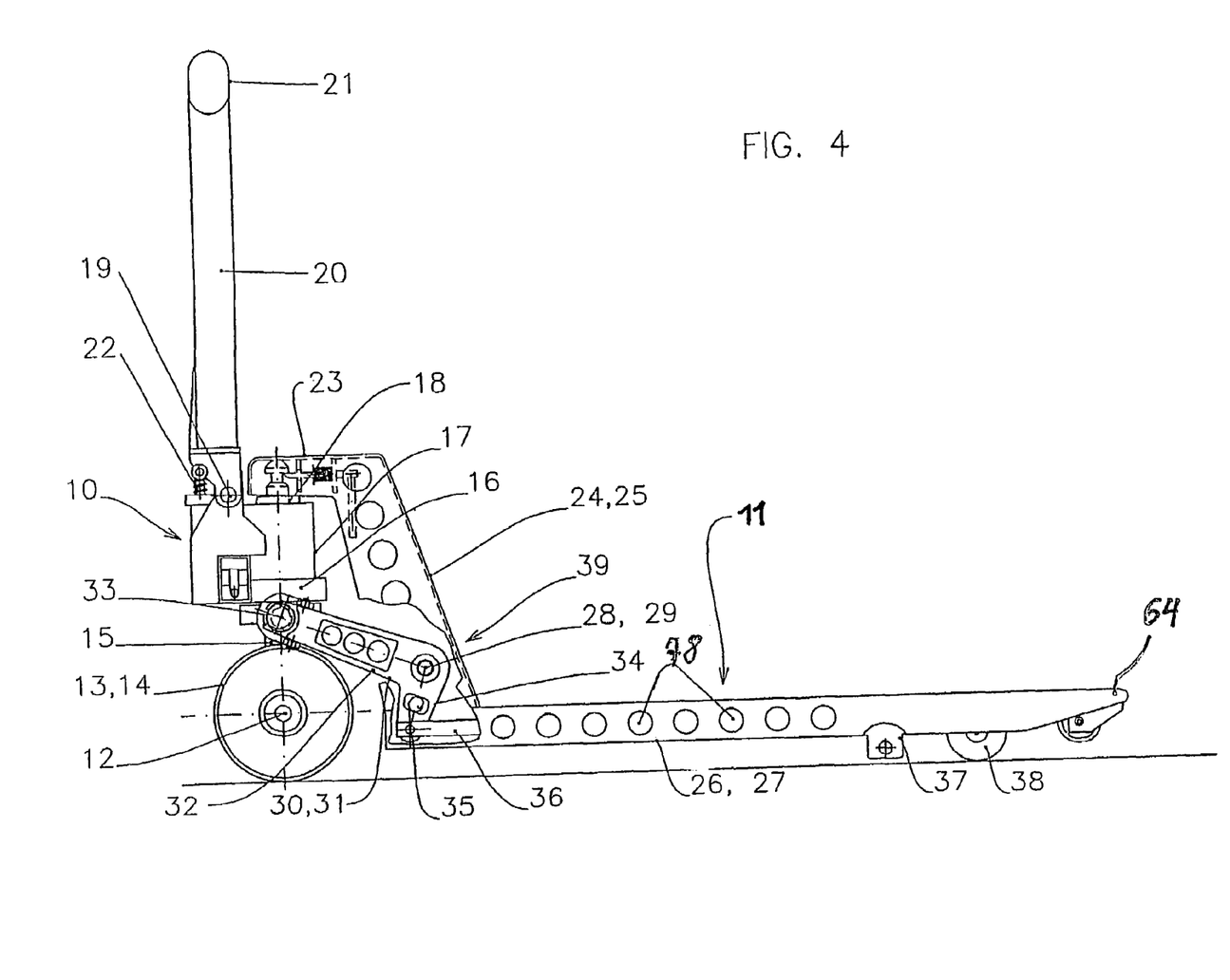

The forklift truck indicated as a whole as 1 and shown in FIGS. 2 and 3, equipped according to the invention, has, as is particularly evident from FIGS. 1 to 4, a rear part 10 and a front part 11. The rear part 10 is connected with the front part 11 in articulated manner and with the ability to move in rotation. Steering wheels 13, 14 are provided on an axle 12, at its two ends, between which wheels a pump housing 17 is provided on a support 15 that rests on the axle 12, on a console 16. A piston rod 18 is mounted to move in the pump housing 17, so as to be displaceable in height. A steering and lifting rod 20 having a handle 21 is mounted on the console 16, by means of a pivot joint 19, so as to pivot in the center longitudinal plane, and is supported on a re-set spring 22. The upper part 23 of the rear part of the fork carrier frame 63 is mounted on the piston rod head of the piston rod 18, which head is configured in spherical shape. Two slanted beams 24, 25 that are directed downward are disposed on the upper part 23, which beams are rigidly connected with a cross-beam and two supporting beams 26, 27. A toggle joint 30, 31 is mounted, in articulated manner, on the two slanted beams 24, 25, in two joints 28, 29, in each instance. The toggle joint is mounted, in articulated manner, on the support 15, in a joint 33, by way of a lever rod 32. The lever arm 34 is connected with a driving rod 36 by way of a joint 35, which rod is connected with a running roller 38 by way of a lever joint 37. The slanted beams 24, 25, together with the upper part 23 of the rear part of the fork carrier frame 63 and the cross-beam, form a holder frame 39. The steering and lifting rod 20, together with the lifting pump that has the pump housing 17 and the piston rod 18, and the steering wheels 13, 14 that are mounted to rotate on the console 16, form the lifting and steering device of the forklift truck 1.

Figure 5:
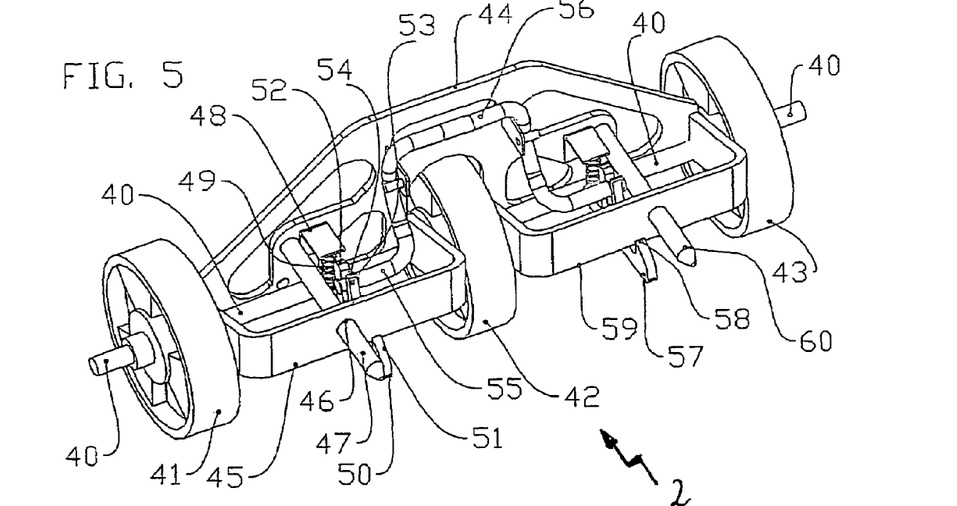

The wheel set shown in FIG. 5, designated as a whole with the reference symbol 2, has three running wheels 41, 42, 43 on an axle 40. A holder plate 44 is disposed on the axle 40 so as to rotate. On the holder plate 44, a stirrup 45 that stands away from the axle is provided between the running wheels 41 and 42, which stirrup has a bore 46 through which a coupling bolt 47 passes, which is attached to the holder plate 44. A bracket plate 48 is attached to the holder plate 44, and a catch 50 having a nose 51 is mounted to pivot on it, under the force of a spring, by way of a spring 49. The catch 50 has a fork having two fork ends 52 and 53, having a slot 54 that lies between them. An unlocking stirrup 55 is mounted in the slot 54, between the two fork ends 52, 53, which stirrup is bent outward to form a handle 56.

Figure 6:
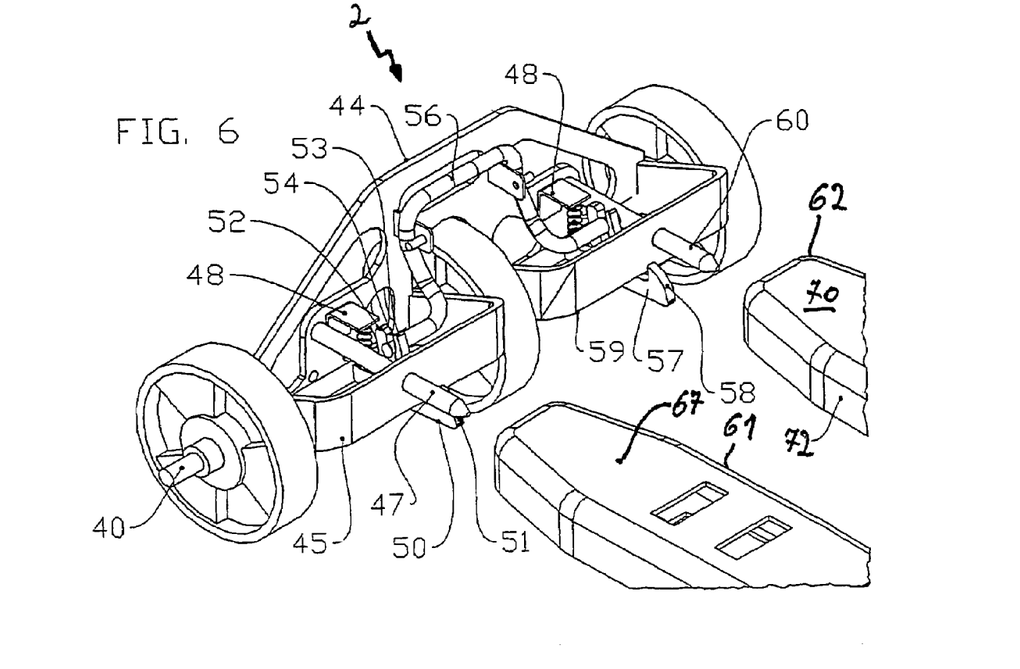

The conditions between the two running wheels 42 and 43 are the same as those in the region between the running wheels 41 and 42, however, the catch 57 with the nose 58 is more clearly evident than in the case of the representation between the running wheels 41 and 42. The catch 57 rests against the stirrup 59, through which a second coupling bolt 60 passes. The position of the catches 50 and 57 that is evident from FIGS. 5 and 6 represents the resting or starting position, and also the locking position, in which the noses 51 and 58 engage in the openings 73 and 74 of the overlapping rails 61 and 62. The catches 50 and 57 are automatically moved into these positions by means of the springs 49.

FIG. 6 once again shows the wheel set shown in FIG. 5 and described above, whereby two overlapping rails 61 and 62 are shown in the vicinity of the wheel set. The overlapping rails 61, 62 are pushed onto the forks or supporting beams 26, 27 of the forklift truck 1 from the front, and extend them in the direction towards the wheel set shown in FIG. 6. They therefore project beyond the ends of the supporting beams 26, 27 that are provided with the reference symbol 64 in FIG. 4. As is evident from FIGS. 6 to 10, the overlapping rails 61, 62 are configured to be essentially closed, at least in their end region that faces the wheel set, by means of an essentially closed top surface 67, 70, bottom surface 68, 71, and a side edge surface 69, 72 that connects the two. The overlapping rails 61, 62 can therefore be pushed onto the supporting beams 26, 27 more or less like a shoe. The centers of the overlapping rails 61 and 62 have the same distance from one another as the two coupling bolts 47 and 60. The two overlapping rails 61 and 62 have coupling bores 65, 66 on their front face, to accommodate the coupling bolts 47, 60, as is particularly evident from FIG. 10.

Figure 7:
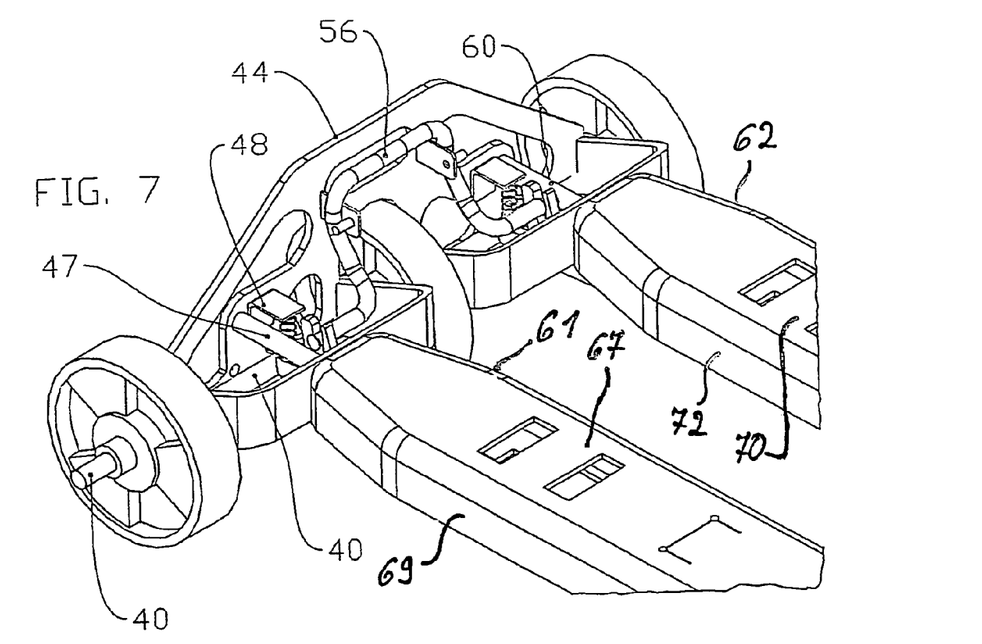

In FIG. 7, the two overlapping rails 61, 62 are firmly set against the two stirrups 45, 59, so that the coupling bolts 47, 60 engage in the coupling bores 65, 66 and, at the same time, the catches 50, 57, with their noses 51, 58, engage in one of the openings 73, 74 configured in the bottom surfaces 68, 71 of the two overlapping rails 61, 62, in each instance.

Figure 8:
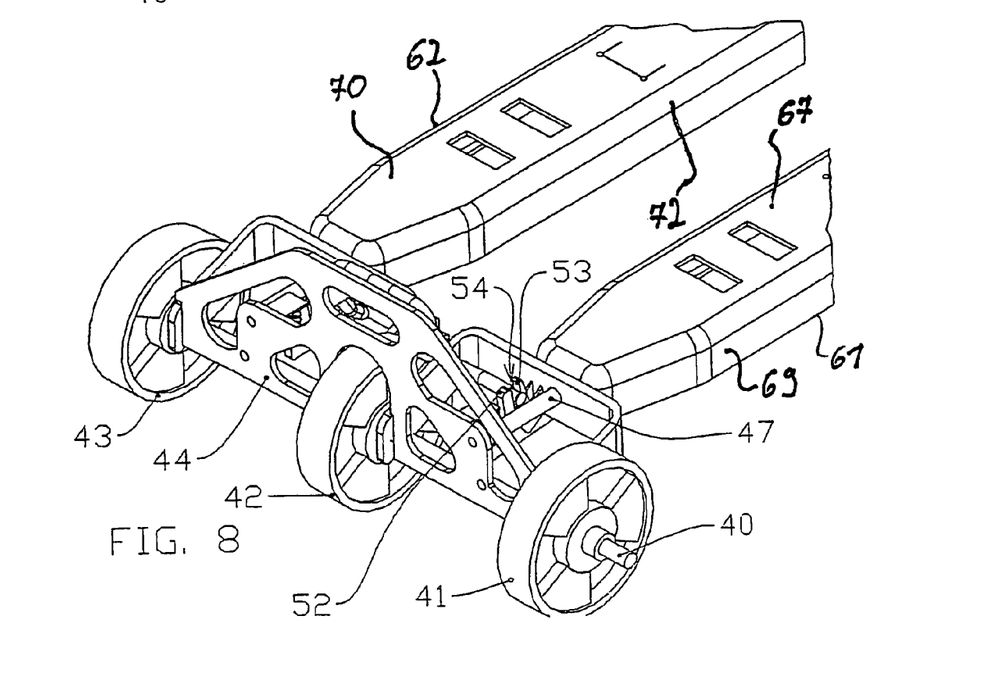

The wheel set shown in FIG. 8, with the two overlapping rails 61, 62 coupled on, is pivoted by about 90° in the counterclockwise direction as compared with the representation according to FIG. 7.

In FIG. 9, the left part of FIG. 5 is shown in an enlarged view. It can be seen that the catch 50 can be moved counter to the force of the spring 49, about an axle 75, which is configured as a tab 76 that is attached to the stirrup 45, whereby the spring 49 moves the catch 50 into the position shown in FIG. 9, if there is no force impact from the outside. The catch 57 is attached and mounted on the stirrup 59, analogously.

Figure 10:
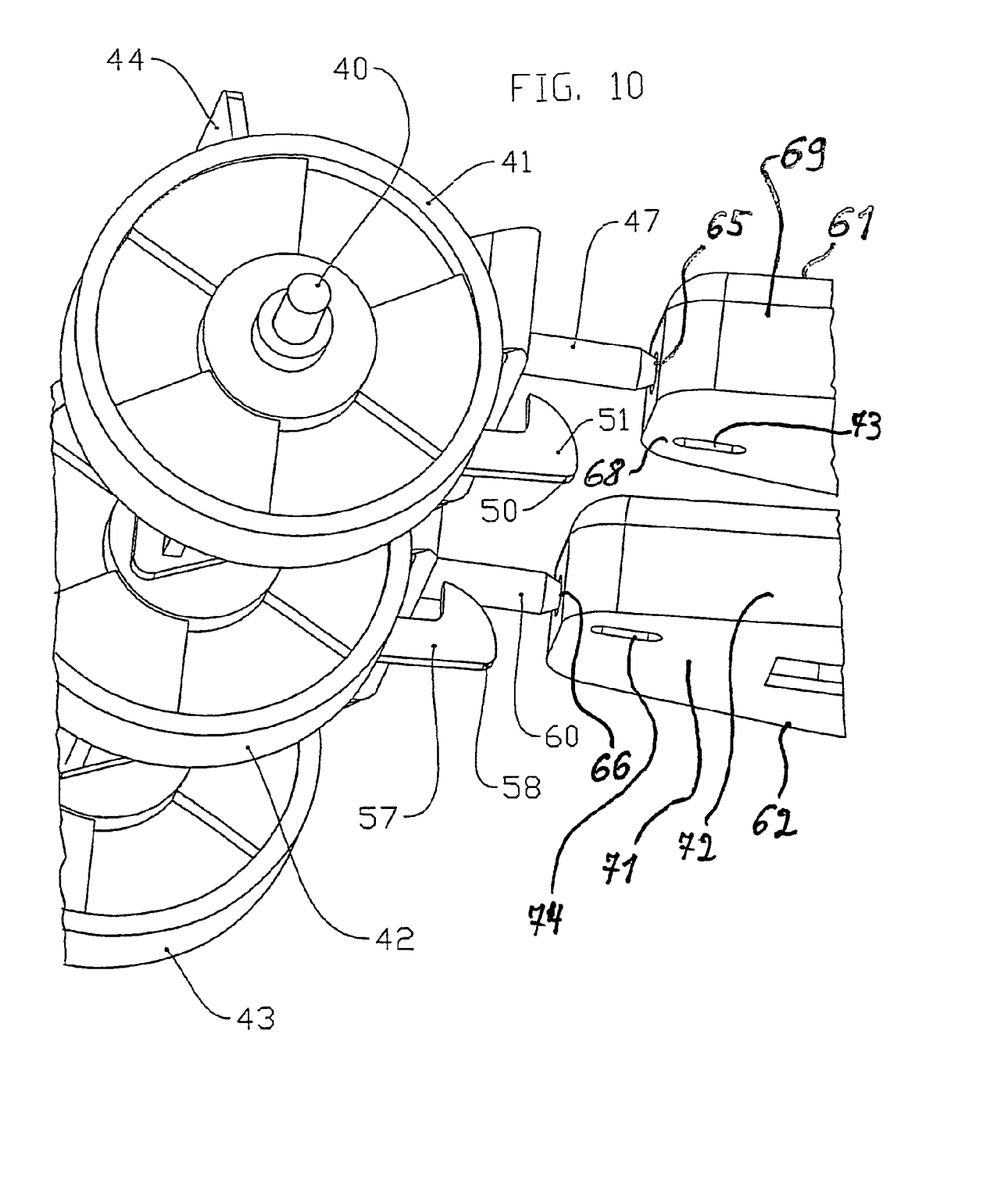

The arrangement of FIG. 6 is similarly shown in FIG. 10, in an enlarged view and rotated. In this way, it is possible to recognize the openings 73, 74 disposed on the overlapping rails 61, 62, into which the catches 50, 57 catch, i.e. engage with their noses 51, 58, in the locked position. The catches 50, 57, together with the coupling bolts 47, 60, form the locking means of the wheel set.

The forklift truck 1 consists of the rear part 10 and the front part 11, whereby the rear part 10 and the front part 11 are releasably connected with one another. The rear part 10 has the pump housing 17, which is configured as a cylinder and in which the piston rod 18 is disposed so as to be displaceable in height. The pump housing 17 stands on the support 15, which is disposed on the axle 12, at the two ends of which a steering wheel 13, 14 is provided, in each instance. The pump housing 17 is mounted on the console 16, on which the steering and lifting rod 20 is disposed so as to pivot in the longitudinal direction of the forklift truck 1. A pin biased by the re-set spring 22 is provided on the steering and lifting rod 20, which pin holds the steering and lifting rod 20 in the vertical position. A lever is provided on the steering and lifting rod 20, with which oil is filled into the pump housing 17, if the steering and lifting rod 20 is moved downward or downward several times in the center longitudinal plane of the forklift truck 1, so that the piston rod 18 moves vertically upward in the pump housing 17.

The front part of the forklift truck 1 has two supporting beams 26, 27 that are oriented parallel to one another and run horizontally, which form the forks of the forklift truck 1 and are connected with one another at their rear end by way of a connecting beam. The holder frame 39, which is slanted upward and has a spherical shell that is open towards the bottom, with which the holder frame 39 rests on the correspondingly spherically shaped piston rod end, is connected with the connecting beam and the two supporting beams 26, 27.

In the position shown in FIG. 2, the forklift truck 1 is moved underneath a pallet. In this position, the overlapping rails 61, 62 that are pushed onto the supporting beams 26, 27 from the front essentially extend the supporting beams 26, 27 beyond their supporting beam ends 64, so that the ends 77 of the overlapping rails 61, 62 project out of the pallet in their position under the pallet.

When the piston rod 18 is subsequently moved out of the pump housing 17, upward, the fork carrier frame 63 with the two supporting beams 26, 27 is lifted upward, until the pallet transport position shown in FIG. 3 has approximately been reached, as compared with the position in which the forklift truck moves under the pallet, as shown in FIG. 2. At this time, however, the running rollers 38 still touch the floor. In this position, the wheel set can then be affixed to the overlapping rails. This is done in that the coupling bolts 47, 60 are introduced into the coupling bore 65, 66 and pushed through until the noses 51, 58 of the catches 50, 57 engage in the underside openings 73, 74. For this purpose, the wheel set can easily be held by the handle 56, which is configured in the shape of a stirrup.

A toggle lever 30, 31 is disposed on both sides, in each instance, between the rear part 10 and the front part 11 of the forklift truck 1, which lever is connected with a driving rod 36 within a related supporting beam 26, 27, in each instance. The driving rod 36 is connected with a running roller 38 disposed in the front region of the related supporting beam 26, 27, in such a manner that when the fork carrier frame 63 with the supporting beams 26, 27 is lifted, the running roller 38 at first maintains contact with the floor, until it has reached its end position, and then, as the fork carrier frame 63 is lifted further, it loses contact with the floor, as shown in FIG. 3. In this position, the forklift truck 1 can then be moved on the steering rollers 13, 14 and the running wheels 41 to 43 of the wheel set, which have a clearly greater diameter as compared with the running roller 38.

The overlapping rails 61, 62 are pushed over the front regions of the supporting beams 26, 27 from the front, and secured on the supporting beams against unintentional displacement. The overlapping rails can have essentially the length of the supporting beams 26, 27, but can also extend merely over a partial region of the longitudinal expanse of the supporting beams, particularly half their length. In FIGS. 2 and 3, the overlapping rails 61, 62 extend over approximately three-fourths of the length of the supporting beams 26, 27. The overlapping rails can be secured on the supporting beams 26, 27, to prevent them from being unintentionally pulled out or pulled off, in many different ways. A flap hinge or a flap tab that is disposed and attached on the end that lies opposite the end 77, on a side edge surface 69, 72 of the overlapping rails 61, 62, and which engages in a perforated pattern 78 formed in the supporting beams 26, 27, in its locking position, is possible, for example.

For special purposes, the overlapping rails 61, 62 can have approximately the length of the supporting beams 26, 27 and be provided with an L-shaped carrier in their rear region, in each instance. In this way, the supporting beams, if they are releasable from the fork carrier frame 63, can be used with the front wheels of the wheel set 2, as a bag truck.

The overlapping rails 61, 62 are disposed symmetrically to the center area between the supporting beams 26, 27, pushed over the front regions of the supporting beams 26, 27, from the front, and secured on the latter against unintentional displacement.

Figure 11:
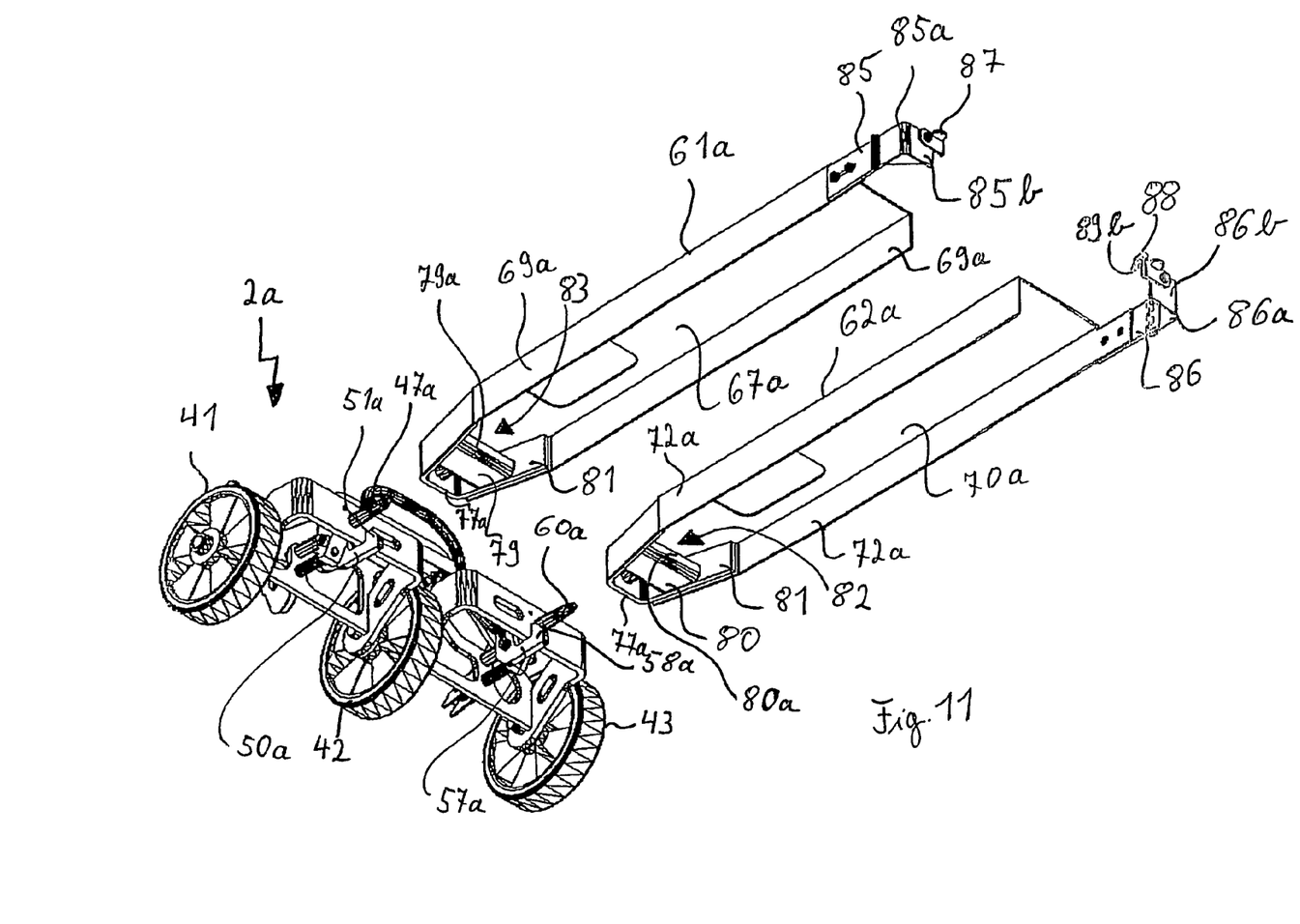

An alternative exemplary embodiment of a forklift truck kit is evident from FIG. 11. FIG. 11 shows two overlapping shoes or shoe-like overlapping rails 61a, 62a with a related wheel set 2a, in a perspective view, at a slant from below. The wheel set 2a is structured essentially identical with the wheel set 2, and has not only three running wheels 41, 42, 43, but also two coupling bolts 47a and 60a, as well as two catches 50a and 57a with a nose 51a and 58a, in each instance. The overlapping rails 61a, 62a are essentially open on their underside and have a cross-beam 79, 80 at their front end, in each instance, on the underside, which are disposed at a distance from the underside of the top surfaces 67a, 70a that corresponds to the usual height/thickness of the front ends/end regions 64 of standard forklift trucks, and are attached to the side edge surfaces 69a, 72a by means of reinforcement plates 81. In this region 82, 83, the front end regions or supporting beam ends 64 are introduced and engage, when the overlapping rail 61a, 62a is or has been pushed onto the supporting beams 26, 27. In this pushed-on position, the coupling bolts 47a, 60a then penetrate the coupling bores 65a, 66a, when the wheel set 2a has been attached to the overlapping rails 61a, 62a, and the noses 51a, 58a engage behind or grasp the contact surfaces 79a, 80a of the cross-beams 79, 80. In this way, the wheel set 2a is then securely locked and attached to the overlapping rails 61a, 62a.

Figure 12:
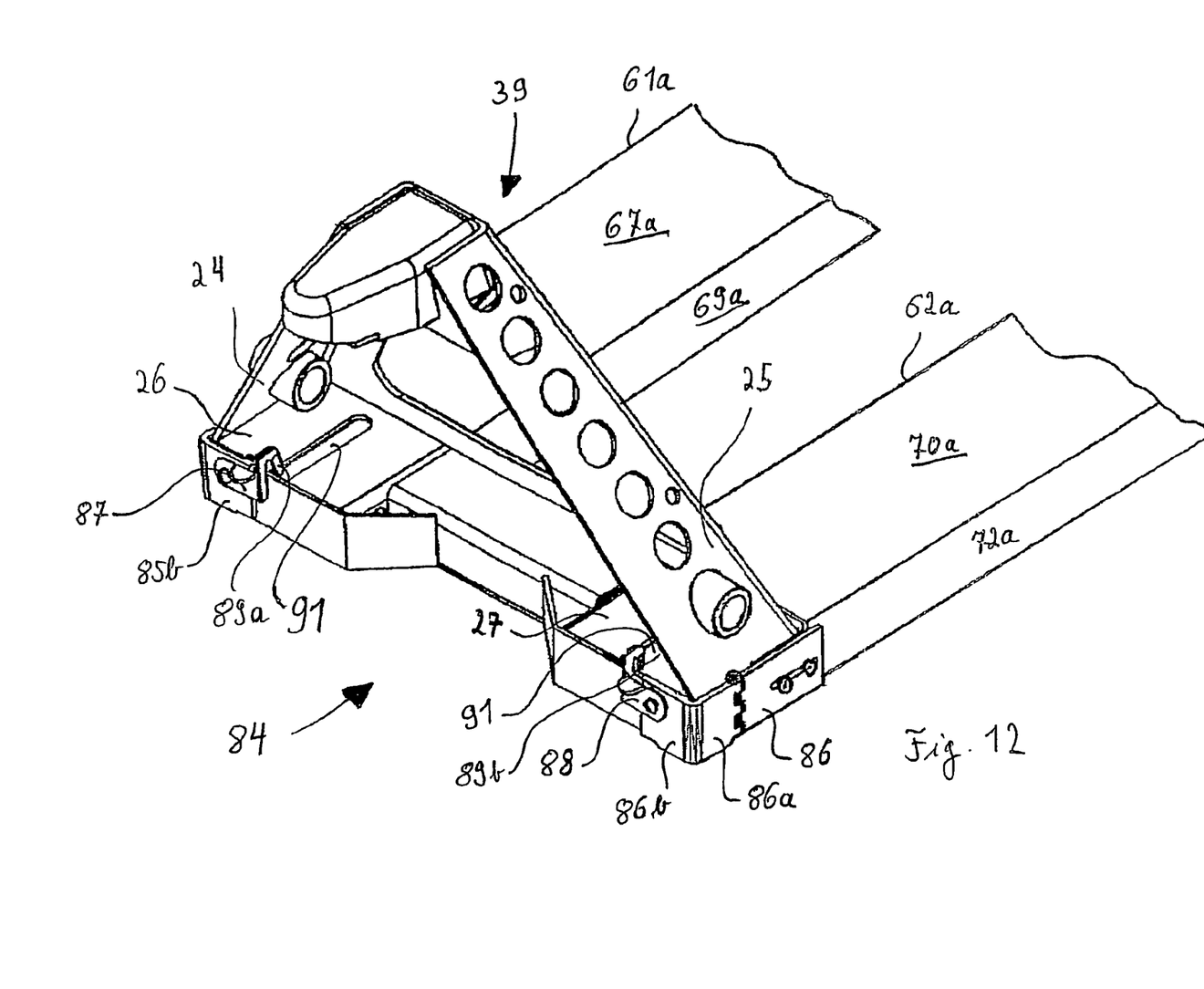

For attachment in the region 84 (FIGS. 1 and 12), the overlapping rails 61a, 62a in turn have an attachment hinge 85, 86, in each instance, having a pivot lever 87, 88, behind the holder frame 39, at the height of the supporting beams 26, 27, in each instance; the hinge is disposed on the side facing away from the front end 77a, on the side edge surface 69a, 70a that lies on the outside of the forklift truck, in each instance. In the position that can be seen in FIG. 12, pushed onto the supporting beams 26, 27, the top surfaces 67a and 70a reach to the front of the slanted beams 24, 25 of the holder frame 39. The pivot parts 85a, 86a can then be pivoted behind the rear ends of the supporting beams 26, 27, in the region 84, so that the hinge parts 85b and 86b come into contact with the supporting beam ends in the region 84. For further attachment, the pivot levers 87, 88 are then pivoted into the position shown in FIGS. 11 and 12, from above, and then engage in openings 90, 91 of the frame 39, below the slanted beams 24, 25, with noses 89a, 89b, in each instance. In this way, the overlapping rails 61a, 62a are then attached to the supporting beams 26, 27 on the forklift truck 1, so that they cannot slip. The overlapping rails 61a, 62a have approximately the length of the supporting beams 26, 27 in this exemplary embodiment.

| Reference Symbol List | |
|---|---|
| 1 | forklift truck |
| 2, 2a | wheel set |
| 10 | rear part |
| 11 | front part |
| 12 | axle |
| 13, 14 | steering wheels |
| 15 | support |
| 16 | console |
| 17 | pump housing |
| 18 | piston rod |
| 19 | pivot joint |
| 20 | steering and lifting rod |
| 21 | handle |
| 22 | re-set spring |
| 23 | upper part |
| 24, 25 | slanted beam |
| 26, 27 | supporting beam |
| 28, 29 | joint |
| 30, 31 | toggle joint |
| 32 | lever rod |
| 33 | joint |
| 34 | lever arm |
| 35 | joint |
| 36 | driving rod |
| 37 | lever arm |
| 38 | running roller |
| 39 | holder frame |
| 40 | axle |
| 41 | running wheel |
| 42 | running wheel |
| 43 | running wheel |
| 44 | holder plate |
| 45 | stirrup |
| 46 | bore |
| 47, 47a | coupling bolt |
| 48 | bracket plate |
| 49 | spring |
| 50, 50a | catch |
| 51, 51a | nose |
| 52 | fork end |
| 53 | fork end |
| 54 | slot |
| 55 | unlocking stirrup |
| 56 | handle |
| 57, 57a | catch |
| 58, 58a | nose |
| 59 | stirrup |
| 60, 60a | coupling bolt |
| 61, 61a | overlapping rail |
| 62, 62a | overlapping rail |
| 63 | fork carrier frame |
| 64 | supporting beam end |
| 65, 65a, 66, 66a | coupling bore |
| 67, 67a, 70, 70a | top surface |
| 68, 71 | bottom surface |
| 69, 69a 72, 72a | side edge surface |
| 73, 74 | opening |
| 75 | axle |
| 76 | tab |
| 77 | end of the overlapping rails |

-continued

Reference Symbol List

| | |
|---|---|
| 78 | perforated pattern |
| 79, 80 | cross-beam |
| 79a, 80a | contact surfaces |
| 81 | reinforcement plate |
| 82, 83 | region |
| 84 | region |
| 85, 86 | attachment hinge |
| 85a, 86a | pivoting part |
| 85b, 86b | hinge part |
| 87, 88 | pivot lever |
| 89a, 89b | nose |
| 90, 91 | openings |

The invention claimed is:

1. Forklift truck comprising two steering wheels mounted on one axle, having a lifting and steering device arranged thereon, and comprising a fork carrier frame mounted on running rollers, said fork carrier frame having two supporting beams and being mounted to interact with the lifting and steering device, and comprising a wheel set that can be disposed on the fork carrier frame, in the region of the front fork ends of the supporting beams,
wherein
the forklift truck has overlapping rails that extend the supporting beams, which are pushed onto the supporting beams and are releasably attached to the fork carrier frame, on the face of which rails the wheel set can be releasably disposed; and
the wheel set has an axle on which a frame that runs parallel to the axle and is disposed to rotate on the axle is disposed, which has a holder plate and two stirrups spaced apart from one another in the longitudinal direction of the axle, at a distance from the holder plate, whereby each stirrup has a coupling bolt that is disposed in fixed manner, with which the wheel set can be releasably coupled to the front ends of the overlapping rails.

2. Forklift truck according to claim 1, wherein the overlapping rails have face openings and underside openings or contact surfaces that can be releasably brought into connection with locking means of the wheel set.

3. Forklift truck according to claim 1, wherein the overlapping rails have a coupling bore that can be brought into engagement with a coupling bolt of the wheel set, in each instance, at their front ends.

4. Forklift truck according to claim 1, wherein the overlapping rails have an engagement opening that can be brought into engagement with a catch that has a nose of the wheel set, in each instance, at the front, on the underside.

5. Forklift truck according to claim 1, wherein the overlapping rails have a contact surface that can be brought into contact with a catch that has a nose of the wheel set, in each instance, at the front, on the underside.

6. Forklift truck according to claim 1, wherein the overlapping rails have approximately the length of the supporting beams.

7. Forklift truck according to claim 6, wherein the supporting beams have an L-shaped carrier in their rear region.

8. Forklift truck according to claim 1, wherein the overlapping rails have about half the length of the supporting beams.

9. Forklift truck according to claim 1, wherein it has two overlapping rails configured symmetrically to the center area between the supporting beams, which are pushed onto the front regions of two supporting beams from the front, and are secured on the latter to prevent unintentional displacement.

10. Forklift truck according to claim 1, wherein the wheel set has running wheels having a diameter that corresponds to the diameter of the steering wheels, disposed on an axle so as to rotate.

11. Forklift truck according to claim 10, wherein the wheel set has two coupling bolts having a distance between them that corresponds to the distance between the center axes of the supporting beams, which coupling bolts can be releasably coupled with the front ends of the overlapping rails.

12. Forklift truck according to claim 1, wherein three running wheels are disposed on the axle of the wheel set.

13. Forklift truck according to claim 1, wherein a running roller is disposed in the region of the front end of the supporting beams, in each instance, which is mounted to be movable to pivot by means of a rod mechanism, in each instance.

14. Forklift truck according to claim 1, wherein it has a lifting device mounted on the axle of two steering wheels, and a fork carrier frame mounted on two running rollers, having two supporting beams, which frame is connected with the lifting and steering device in movable manner, whereby the lifting device has a lifting pump that is disposed on a console, which is disposed on a support mounted on the axle between the two steering wheels, and whereby a steering and lifting rod is disposed on the lifting pump, and the lifting pump has a piston rod whose head projects upward out of the pump housing of the lifting pump, and whereby a running roller is disposed on the front end of the two supporting beams, in each instance, and the supporting beams are connected with one another at the rear end, by way of a cross-beam, and a holder frame having a joint pan is provided at the rear end of the supporting beams, which pan is mounted on the head of the piston rod, in articulated manner, and whereby a two-arm rod mechanism is disposed on both sides of the console, in each instance, the rear arms of which are connected with the console, and the front rods of which are connected with the related running roller, so as to pivot, in each instance.

15. Forklift truck according to claim 4, wherein a rear part of the catches that have a nose, in each instance, is mounted on the holder plate under spring force.

16. Forklift truck kit, comprising overlapping rails that can be pushed onto the supporting beams of a fork carrier frame of a forklift truck, and releasably attached to the fork carrier frame, which extend the supporting beams in their position in which they are pushed onto the supporting beams, and by a wheel set that can be releasably attached to the face of two overlapping rails in their position in which they are pushed onto the supporting beams;
wherein the wheel set has an axle on which a frame that runs parallel to the axle and is disposed to rotate on the axle is disposed, which has a holder plate and two stirrups spaced apart from one another in the longitudinal direction of the axle, at a distance from the holder plate, whereby each stirrup has a coupling bolt that is disposed in fixed manner, with which the wheel set can be releasably coupled to the front ends of the overlapping rails.

17. Forklift truck kit according to claim 16, wherein three running wheels are disposed on the axle of the wheel set.

18. Forklift truck kit according to claim 16, wherein the overlapping rails have face openings and underside openings or contact surfaces that can be releasably brought into connection with locking means of the wheel set.

19. Forklift truck kit according to claim 16, wherein the overlapping rails have a coupling bore that can be brought into engagement with a coupling bolt of the wheel set, in each instance, at their front ends.

20. Forklift truck kit according to claim 16, wherein the wheel set has two coupling bolts having a distance between them that corresponds to the distance between the center axes of the supporting beams, which coupling bolts can be releasably coupled with the front ends of the overlapping rails.

21. Forklift truck kit according to claim 1, wherein the overlapping rails have a contact surface that can be brought into contact with catch that has a nose of the wheel set, in each instance, at the front, on the underside.

22. Forklift truck kit according to claim 16, wherein the overlapping rails at have approximately the length of the supporting beams.

23. Forklift truck kit according to claim 16, wherein the overlapping rails have about half the length of the supporting beams.

24. Forklift truck kit according to claim 16, wherein the overlapping rails can be pushed onto the supporting beams from the front.

25. Forklift truck kit according to claim 16, wherein the wheel set has running wheels having a diameter that corresponds to the diameter of the steering wheels, disposed on an axle so as to rotate.

26. Forklift truck kit according to claim 16, wherein the overlapping rails have an engagement opening that can be brought into engagement with catch that has a nose of the wheel set, in each instance, at the front, on the underside.

27. Forklift truck kit according to claim 21, wherein a rear part of the catches that have a nose, in each instance, is mounted on the holder plate under spring force.

* * * * *

UNITED STATES PATENT AND TRADEMARK OFFICE
CERTIFICATE OF CORRECTION

| | | |
|---|---|---|
| PATENT NO. | : 7,731,206 B2 | Page 1 of 1 |
| APPLICATION NO. | : 10/553808 | |
| DATED | : June 8, 2010 | |
| INVENTOR(S) | : Borrmann | |

It is certified that error appears in the above-identified patent and that said Letters Patent is hereby corrected as shown below:

In particular, on the cover page, Item [86], please change the §371 (c)(1), (2), (4) Date from "Oct. 18, 200
    5" to correctly read as follows. --Oct. 18, 2005--.

In Column 10, line 44 (Line 5 of Claim 16), after the word "and" please delete: "by".

Signed and Sealed this

Twenty-fourth Day of August, 2010

David J. Kappos
*Director of the United States Patent and Trademark Office*